United States Patent
Sundaramurthy et al.

(10) Patent No.: US 8,434,153 B2
(45) Date of Patent: Apr. 30, 2013

(54) APPLICATION DISPLAY ON A LOCKED DEVICE

(75) Inventors: Palani Sundaramurthy, Kirkland, WA (US); Igor B. Peev, Seattle, WA (US); Robert Charles Johnstone Pengelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 12/546,216

(22) Filed: Aug. 24, 2009

(65) Prior Publication Data

US 2011/0047368 A1 Feb. 24, 2011

(51) Int. Cl.
*G06F 21/00* (2006.01)

(52) U.S. Cl.
USPC ................ 726/26; 726/27; 713/100; 715/863

(58) Field of Classification Search .................. None
See application file for complete search history.

(56) References Cited

U.S. PATENT DOCUMENTS

| 6,353,449 | B1 | 3/2002 | Gregg et al. | |
|---|---|---|---|---|
| 8,136,053 | B1* | 3/2012 | Miller et al. | 715/863 |
| 2003/0054862 | A1* | 3/2003 | Chae et al. | 455/565 |
| 2004/0093582 | A1 | 5/2004 | Segura | |
| 2004/0121823 | A1 | 6/2004 | Noesgaard et al. | |
| 2007/0150842 | A1 | 6/2007 | Chaudhri et al. | |
| 2007/0180492 | A1 | 8/2007 | Hassan et al. | |
| 2008/0220752 | A1 | 9/2008 | Forstall et al. | |
| 2008/0320496 | A1 | 12/2008 | Barinov et al. | |
| 2009/0005011 | A1 | 1/2009 | Christie et al. | |
| 2009/0061837 | A1 | 3/2009 | Chaudhri et al. | |
| 2010/0001967 | A1* | 1/2010 | Yoo | 345/173 |
| 2010/0159995 | A1* | 6/2010 | Stallings et al. | 455/566 |
| 2010/0306705 | A1* | 12/2010 | Nilsson | 715/835 |
| 2012/0046079 | A1* | 2/2012 | Kim et al. | 455/566 |

FOREIGN PATENT DOCUMENTS

| KR | 1020030078077 A | 10/2003 |
|---|---|---|
| KR | 100823871 B1 | 4/2008 |
| KR | 1020080041937 A | 5/2008 |
| WO | WO-03075258 | 9/2003 |
| WO | WO-2010136854 | 12/2010 |

OTHER PUBLICATIONS

Intelliborn, "IntelliScreen Support Knowledgebase," Wayback Machine, Dec. 20, 2008, Accessed on Nov. 17, 2011, Retrieved [http://web.archive.org/web/20081218215426/http://support.intelliborn.com/index.php?option=com_kb].*

Intelliborn, "IntelliScreen 2.2" Wayback Machine, Jan. 5, 2009, Accessed on Nov. 17, 2011, Retrieved [http://web.archive.org/web/20090105161813/http://intelliborn.com/].*

(Continued)

*Primary Examiner* — Jung Kim
*Assistant Examiner* — Robert Leung
(74) *Attorney, Agent, or Firm* — Wolfe-SBMC

(57) ABSTRACT

A user request to display an application while the device is locked is received. In response to this user request, one or more images generated by the application are obtained and displayed while the device is locked. Additionally, an indication of an application to be displayed upon resuming operation from a power-saving mode can be received, and an image generated by the application is displayed in response to resuming operation from the power-saving mode.

20 Claims, 8 Drawing Sheets

OTHER PUBLICATIONS

Douglas, "RemindYou 1.0.2", Apple iPhone School, Jun. 4, 2008, Accessed Apr. 30, 2012, Online: http://www.appleiphoneschool.com/2008/06/04/remindyou-102/.*

Make Your Day Media, "RemindYou", Internet Archive: Wayback Machine, Jul. 1, 2008, Accessed Apr. 30, 2012, Online: http://web.archive.org/web/20080701160502/http://www.makeyourdaymedia.com/MoreInfo.htm.* iClarified, "How to Install and Use IntelliScreen for iPhone", May 14, 2008, Accessed Apr. 30, 2012, Online: http://www.iclarified.com/entry/index.php?enid=1128.*

"International Search Report", Mailed Date: Apr. 29, 2011, Application No. PCT/US2010/046278, Filed Date: Aug. 23, 2010, pp. 9.

"Apple Remote Desktop: How to Create a Custom "Locked Screen" Picture", retrieved at <<http://support.apple.com/kb/TA20751?viewlocale=en_US>>, Jul. 24, 2007, p. 1.

"IntelliScreen Makes Info Appear on Locked iPhone Screen", retrieved at <<http://iphoneindia.gyanin.com/2008/05/15/intelliscreen-makes-info-appear-on-locked-iphone-screen/>>, 2008, pp. 7.

"Calendar on Main Screen/Locked Screen?", retrieved at <<http://www.modmyi.com/forums/3rd-party-apps-requests/21023-calendar-main-screen-locked-screen.html>>, Jul. 10, 2009, pp. 2.

Robbins, Daniel C., "TapGlance: Designing a Unified Smartphone Interface for Personal Information Management", retrieved at <<http://pim2008.ethz.ch/papers/pim2008-robbins.pdf>>, pp. 11.

Ebrahim, "Lock the Screen While in Full-Screen Mode in Windows Media Player", retrieved at <<http://www.howtogeek.com/howto/windows-vista/lock-the-screen-while-in-full-screen-mode-in-windows-media-player/ >>, Dec. 13, 2007, pp. 2.

"Foreign Office Action", European Patent Application No. 10814191.2, (Dec. 3, 2012), 6 pages.

"Supplementary European Search Report", European Patent Application No. 10814191.2, (Nov. 19, 2012), 3 pages.

* cited by examiner

APPLICATION DISPLAY ON A LOCKED DEVICE

BACKGROUND

Mobile communications devices, such as wireless phones, have become increasingly commonplace. Due to their typically small size, such mobile communications devices can oftentimes be easily kept in a pocket, briefcase, purse, etc. Storing mobile communications devices in such locations can be problematic because the devices can be accidentally activated, causing unwanted actions to be performed by the devices. To prevent such accidental activation, some mobile communications devices can be locked by a user entering a particular key sequence, and then unlocked by the user entering another particular key sequence. When locked, the device typically accepts no inputs (except inputs to unlock the device), and displays some default or generic screen to the user. While such locking prevents accidental activation of the device, it is not without its problems. One such problem is that locking and unlocking the device can be a time-consuming and cumbersome process for the user, which can result in frustrating experiences when users are trying to use the mobile communications devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a user request to display an application while the device is locked is received. In response to the user request to display the application while the device is locked, an image generated by the application is obtained and displayed while the device is locked.

In accordance with one or more aspects, an indication of an application to be displayed upon resuming operation from a power-saving mode is received. An image generated by the application is displayed in response to resuming operation from the power-saving mode.

BRIEF DESCRIPTION OF THE DRAWINGS

The same numbers are used throughout the drawings to reference like features.

DETAILED DESCRIPTION

Application display on a locked device is discussed herein. A user of a device can request, such as with a simple finger gesture, that a particular application be displayed while the device is locked. In response to the request, images generated by the application continue to be displayed while the device is locked. The images displayed can change as the application runs while the device is locked, allowing the user to continually view updates from the application despite the device being locked. Alternatively, the device can be locked and placed in a power-saving mode in which no images are displayed. Upon resuming from the power-saving mode, the device remains locked but is also displaying images generated by a particular application requested by the user.

Figure 1:
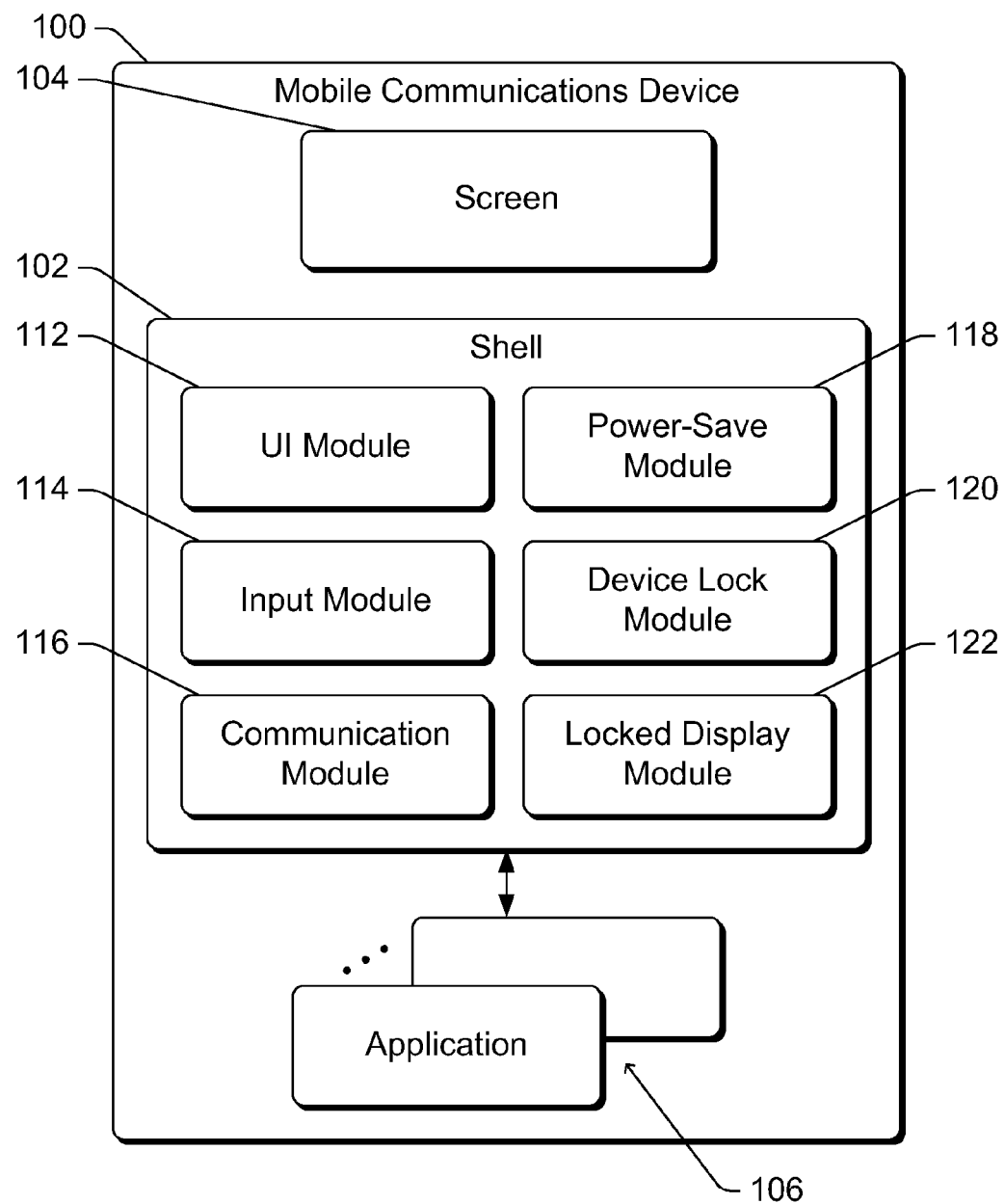
FIG. 1 illustrates an example mobile communications device implementing the application display on a locked device in accordance with one or more embodiments.

FIG. 1 illustrates an example mobile communications device 100 implementing the application display on a locked device in accordance with one or more embodiments. A mobile communications device refers to a communications device capable of sending and receiving communications, such as phone calls, text messages, messages including other content types, and so forth. Communications device 100 is referred to as being mobile because it is typically designed to be moved and used in different locations by users. Mobile communications device 100 can be a variety of different types of devices, such as a cellular phone, a satellite phone, other types of wireless phones, a handheld computer, a personal digital assistant (PDA), an audio and/or video playback device, a portable game device, an automotive computer, a dedicated messaging device, a netbook, and so forth. It is to be appreciated that mobile communications device 100 can include functionality in addition to being able to send and receive communications calls, such as calendar functionality, audio and/or video playback functionality, mapping or location-tracking functionality, and so forth. Although some discussions herein refer to the application display on a locked device being implemented on a mobile communications device, it is to be appreciated that the application display on a locked device can alternatively be implemented on other types of devices.

Mobile communications device 100 includes a shell module 102, a screen 104, and one or more applications 106. Shell module 102 includes a user interface (UI) module 112, an input module 114, a communication module 116, a power-save module 118, a device lock module 120, and a locked display module 122. Each of modules 102, 112, 114, 116, 118, 120, and 122 can be implemented in software, firmware, hardware, or combinations thereof. When implemented in software or firmware, such a module includes one or more instructions that are executed by one or more processors or controllers of mobile communications device 100.

Screen 104 is a display component of mobile communications device 100. Screen 104 can be implemented in a variety of different manners, such as using liquid crystal display (LCD) technology, plasma screen technology, image projection technology, and so forth. Alternatively, rather than including screen 104, mobile communications device 100 can generate one or more signals that are output to one or more other display devices which include screen 104.

Shell module 102 includes one or more modules that manage communications, receive user inputs, display images, and so forth as discussed in more detail below. Applications 106 communicate with shell module 102 and provide various functionality. Applications 106 typically rely on shell module 102 to manage receiving of user inputs on behalf of the applications 106, and displaying images generated by applications 106 on screen 104. A variety of different types of applications can be included as applications 106, such as productivity applications (e.g., spreadsheet applications, word processing applications), recreational applications (e.g., games), resource applications (e.g., databases, digital books), audio/video applications (e.g., digital cameras, digital video cameras, music playback programs), mapping or tracking applications, and so forth.

Input module 114 receives user inputs from a user of mobile communications device 100. User inputs can be provided in a variety of different manners, such as by pressing a particular portion of a touchpad or touchscreen of device 100, or pressing one or more keys of a keypad or keyboard of device 100. Touchscreen functionality can be provided using a variety of different technologies, such as through capacitive, surface acoustic wave, resistive, optical, strain gauge, dispersive signals, acoustic pulse, or other touchscreen technologies. The user input can also be provided in other manners, such as via audible inputs, other physical feedback input to the device (e.g., tapping any portion of device 100 or another action that can be recognized by a motion detection component of device 100, such as shaking device 100, rotating device 100, etc.), and so forth.

UI module 112 generates, manages, and/or outputs a user interface for display on screen 104. This user interface displays various information on screen 104, and user inputs can be received by input module 114 as discussed above. UI module 112 can display, for example, messages sent by mobile communications device 100 to other devices, messages received by mobile communications device 100 from other devices, images generated by applications 106, and so forth.

Communication module 106 manages receiving of communications from and sending of communications to other devices, including other mobile devices. Mobile communications device 100 can communicate with other devices using a variety of different technologies and protocols, such as cellular, satellite, and/or other technologies or protocols. The technologies or protocols can include wireless and/or wired technologies and protocols.

Communication module 106 supports one or more of a variety of different types of communications with other devices. One type of communication typically supported by communication module 106 is a voice call. This can include voice calls that are initiated by mobile communications device 100 (e.g., outgoing calls), as well as voice calls that are initiated by other devices (e.g., incoming calls). Alternatively, mobile communications device 100 can support other types of communications, and need not support voice calls.

Another type of communication supported by communication module 106 is a message, which refers to text messages or messages with other types of media such as images, video, audio, combinations of types of media, and so forth. Such messages can comply, for example, with the Short Message Service (SMS) communication protocol or the Multimedia Messaging Service (MMS) communication protocol. Various other types of communications can also be supported by communication module 106, such as mobile instant messaging (mobile IM), email (electronic mail), and so forth.

Power-save module 118 manages power saving functionality for mobile communications device 100. This functionality is typically designed to conserve one or more batteries powering device 100. Power-save module 118 supports various power-saving modes implementing various power saving functionality, such as decreasing the brightness of screen 104, turning off screen 104, reducing the operating speed and/or power of a processor of device 100, turning off one or more input/output components of device 100, and so forth. Different types of power saving functionality can be implemented by power-save module 118, and which power saving functionality is implemented at which times can vary. For example, power-save module 118 can be configured to enter a first power-saving mode by decreasing the brightness of screen 104 after a first amount of time has passed with no user input being received by module 114, and to enter a second power-saving mode by turning off the screen 104 after a second amount of time has passed with no user input being received by module 114.

Device lock module 120 manages the locking of mobile communications device 100. Device 100 is locked to prevent accidental activation of the device. When device 100 is locked, module 120 prevents most inputs received by input module 114 from being acted upon by device 120. This prevention can be performed in different manners, such as module 120 intercepting and ignoring such inputs, module 120 informing input module 114 to ignore such inputs, and so forth. When device 100 is locked, device lock module 120 monitors inputs received by input module 114 for a particular input. This particular input is, for example, activation or selection of a particular key or button, activation or selection of a particular key sequence or button sequence, inputting of a particular gesture, and so forth. This particular input is interpreted by device lock module 120 as a user request to unlock mobile communications device 100.

In response to a user request to unlock mobile communications device 100, device lock module 120 unlocks device 100. When unlocked, module 120 no longer prevents inputs received by module 114 from being acted upon by device 120. For example, module 120 can stop intercepting and ignoring such inputs, module 120 can inform input module 114 to no longer ignore such inputs, and so forth.

Locked display module 122 manages the display of images from an application 106 while mobile communications device 100 is locked. Rather than displaying a generic image on screen 104 when device 100 is locked, module 122 allows images generated by an application 106 to be displayed while device 100 is locked. As the application 106 runs and updates the images it displays, at least some of these updated images are displayed by module 122 on screen 104.

In one or more embodiments, a user of mobile communications device 100 inputs a request via input module 114 for a particular application to be displayed while device 100 is locked. In response to such a request, locked display module 122 displays images generated by the particular application while device 100 is locked. The user request can be input in a variety of different manners via input module 114. For example, the user request can be input by the user entering a gesture with his or her finger via a touchscreen or touchpad (e.g., a circle, the letter "Z", etc.), by the user selecting a menu item (e.g., a "display when locked" menu item), by the user moving the device in a particular manner (e.g., rotating the device, tapping the device twice in quick succession, etc.), and so forth.

One or more different applications 106 can be run on mobile communications device 100, including running multiple applications 106 concurrently. Multiple applications 106 can be run concurrently on device 100 in a variety of different conventional manners. The multiple applications typically have a depth ordering, with applications being viewed as running at particular depths or Z-orders. Which application is at which depth or level changes based on user requests to use the applications, such as more recently requested applications being a higher level than less recently requested applications. The top-level application of applications 106 can change, and is typically the application that is currently being used (or was most recently used or selected) by the user. This top-level application at any particular time is also typically the application that is being displayed on screen 104 at that particular time.

In one or more embodiments, locked display module 122 displays images generated by the top-level application 106 at the time the user request for a particular application to be displayed while device 100 is received. Accordingly, the user can easily request that a particular application be displayed while device 100 is locked by having that particular application be the top-level application, and then entering the request for the application to be displayed while device 100 is locked.

Figure 2:
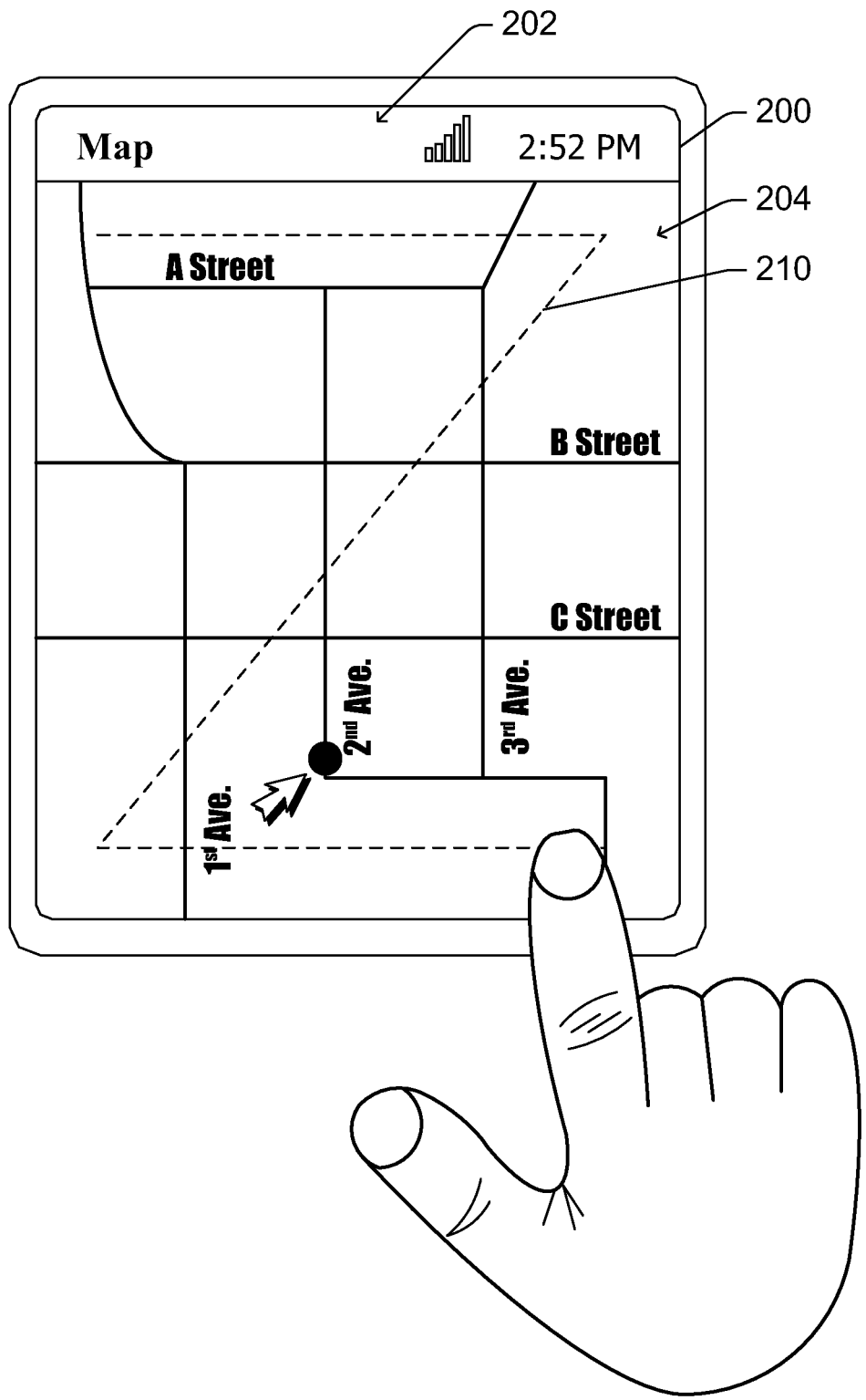
FIG. 2 is a diagram illustrating an example screen display of a mobile communications device in accordance with one or more embodiments.

FIG. 2 is a diagram illustrating an example screen display of a mobile communications device in accordance with one or more embodiments. In FIG. 2, a screen 200 is displayed having a header portion 202 and an application display portion 204. Images generated by an application running on the mobile communications device are displayed in application display portion 204, while information describing those applications and/or the operation of the mobile communications device is displayed in header portion 202. For example, header portion 202 can include a name of the application being displayed in portion 204 ("Map"), one or more vertical bars indicating the strength of a wireless signal being received by the mobile communications device, and a current time. It is to be appreciated, however, that different and/or additional information can be displayed in header portion 202.

In the example of FIG. 2, the application running on the mobile communications device is a map application that displays the current location of the mobile communications device on a map. Various streets are illustrated in display portion 204, along with an arrow and large dot to identify the current location of the mobile communications device. The current location of the mobile communications device can be determined in a variety of different manners, such as based on Global Positioning System (GPS) signals received by the mobile communications device, based on signals or information received from cellular towers or other wireless base stations, and so forth. It is to be appreciated that the map application is an example, and that alternatively images generated by other applications can alternatively be displayed in display portion 204.

FIG. 2 illustrates an example of a user request being entered by a user with a gesture of his or her finger. The gesture illustrated in FIG. 2 is a large "Z" shape, which is illustrated as broken line 210. The input of this "Z" shape is interpreted by locked display module 122 of FIG. 1 as a user request for a particular application to be displayed while the mobile communications device is locked. The particular application is the application being displayed when the gesture is made, which is the map application in FIG. 2.

Figure 3:
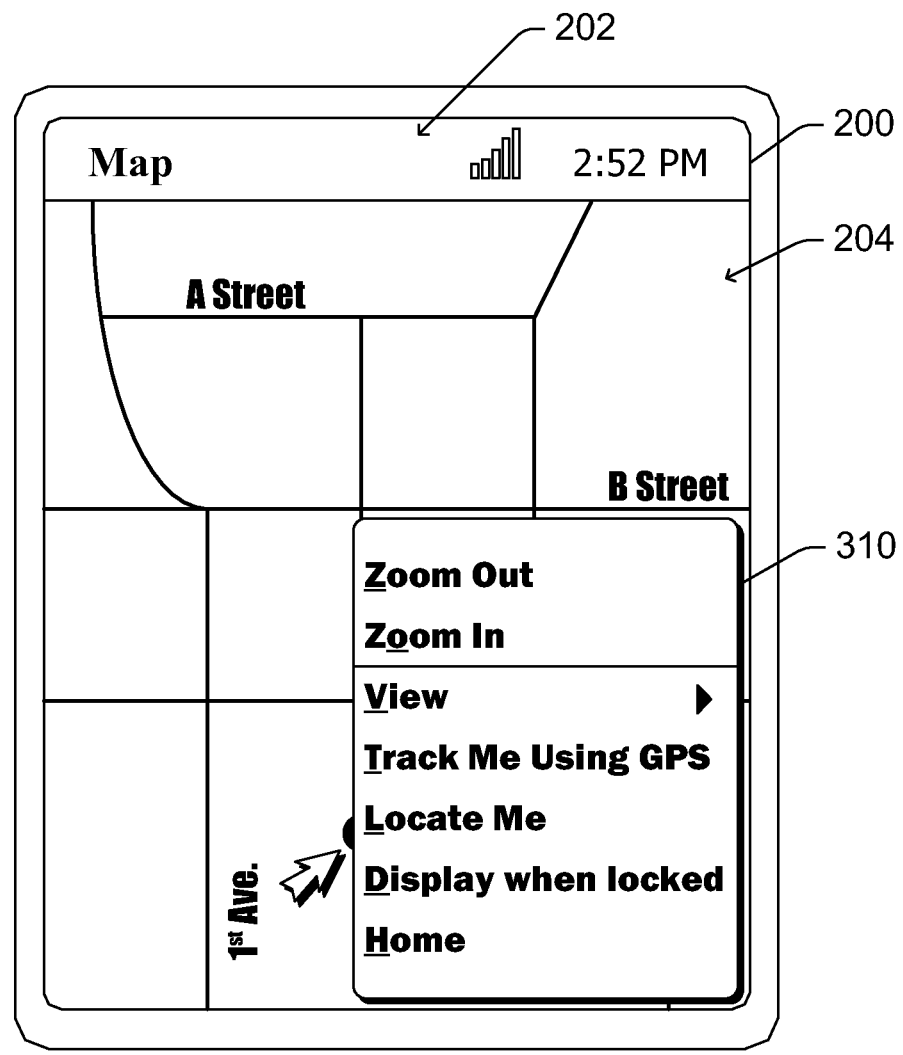
FIG. 3 is a diagram illustrating another example screen display of a mobile communications device in accordance with one or more embodiments.

FIG. 3 is a diagram illustrating another example screen display of a mobile communications device in accordance with one or more embodiments. In FIG. 3, screen 200 is displayed having a header portion 202 and an application display portion 204 as discussed above with reference to FIG. 2. However, FIG. 3 illustrates an example of a user request being entered by a user selection of a menu item.

In FIG. 3, a menu 310 is displayed including various menu items from which the user can select. Menu 310 can be displayed in response to a variety of different commands, such as user selection of a "menu" button or key, the user entering a particular gesture with his or her finger and/or providing physical feedback to the mobile communications device in a particular manner, and so forth. Menu 310 includes a "display when locked" menu item, which can be selected by the user. The user can select menu items in a variety of different manners, such as by touching the displayed menu item with his or her finger, navigating the menu items using directional buttons and pressing a "select" or "ok" button when the menu item is highlighted, and so forth. The user selection of the "display when locked" menu item is interpreted by locked display module 122 of FIG. 1 as a user request for a particular application to be displayed while the mobile communications device is locked. The particular application is the application being displayed when the menu item selection is made, which is the map application in FIG. 3.

Returning to FIG. 1, mobile communications device 100 can be locked at some time after a user request for a particular application to be displayed while device 100 is locked is received. Device 100 can be locked in response to a user request, or alternatively in response to some other action or event (e.g., after a particular amount of time of no user input being received by device 100). In one or more embodiments, the user request for a particular application to be displayed while device 100 is locked is also a request to lock device 100, although alternatively the request to lock device 100 can be a separate user input.

Additionally, in response to a request for an application to be displayed while device 100 is locked, locked display module 122 prevents the power saving functionality provided by power-save module 118 from entering a power-saving mode. In one or more embodiments, locked display module 122 notifies power-save module 118 that module 118 should cease its power saving functionality. In response to such a notification, power-save module 118 ceases performing its power saving functionality, such as decreasing the brightness of screen 104 and/or turning off screen 104, by not entering power-saving modes. This cessation of the power saving functionality continues until power-save module 118 is notified to resume its power saving functionality (e.g., by device lock module 120 in response to device 100 being unlocked).

Alternatively, rather than not entering a power-saving mode, power-save module 118 can alter its entering a power-saving mode. This alteration can include not entering certain power-saving modes and/or changing the time of when certain power-saving modes are entered. For example, power-save module 118 may normally enter a first power-saving mode by decreasing the brightness of screen 104 after a first amount of time of no user input being received, and then enter a second power-saving mode by turning off screen 104 after a second amount of time of no user input being received. Power-save module 118 can alter this functionality to not enter the first power-saving mode, but may still enter the second-power saving mode after a particular amount of time of no user input being received (which may be the same amount of time as the second amount of time, or alternatively may be a longer or shorter amount of time).

Whether to enter and/or when to enter a power-saving mode can be determined in different manners. In one or more embodiments, power-save module 118 is configured with an indication of when (and whether) to enter particular power-saving modes in response to a notification to cease power saving functionality received from locked display module 122. Alternatively, an indication of when (and whether) to enter particular power-saving modes can be provided by locked display module 122 and/or the application 106 to be displayed while device 100 is locked.

Alternatively, locked display module 122 can determine when (and whether) device 100 is to enter particular power-saving modes in other manners. For example, locked display module 122 can intercept commands issued by power-save module 118, such as commands to turn off screen 104, commands to reduce the brightness of screen 104, and so forth. These intercepted commands can be deleted (so that they are not performed) and/or altered by locked display module 122.

Locked display module 122 displays images generated by a particular application 106 while device 100 is locked, and can display these images in a variety of different manners. In one or more embodiments, the particular application 106 continues to run while device 100 is locked, generating images for display as if device 100 were not locked. Locked display module 122 provides these images to a display driver associated with screen 104 in a same manner as when device 100 is not locked, which displays the images as if device 100 were not locked.

Alternatively, locked display module 122 can display images generated by a particular application 106 in other manners. For example, the particular application 106 can continue to run and generate images for display while device 100 is locked, but locked display module 122 does not provide all of these images to the display driver associated with screen 104. Rather, locked display module 122 selects images at regular or irregular intervals (e.g., every ten or fifteen seconds, every minute, etc.), and provides those selected images to the display driver associated with screen 104. These intervals can vary based on application 106. For example, it may be desirable to have more frequent updates for an application 106 that is a mapping application than for an application 106 that is a stock quote application.

Whether images generated by an application 106 are displayed as if device 100 were not locked, or whether images generated by an application 106 are displayed at some other interval, application 106 need have no knowledge that device 100 is locked. Rather, application 106 continues running until receiving a notification from shell 102 to cease running.

Alternatively, application 106 can be notified (e.g., by locked display module 122) that device 100 is locked, and in response the behavior of application 106 can be altered. For example, application 106 can invoke a method of an application programming interface (API) exposed by locked display module 122 to provide module 122 with images to be displayed while device 106 is locked. Module 122 receives these images and provides the received images to the display driver associated with screen 104. The particular images generates for display while device 106 is locked, and the frequency with which those particular images are generated, is determined by the application 106.

Regardless of the manner in which locked display module 122 displays images generated by application 106 while device 100 is locked, user inputs to application 106 are prevented because device 100 is locked. Thus, the user is able to continue to see the images generated or otherwise output by application 106, but is not able to provide inputs to application 106 until device 100 is unlocked.

Figure 4:
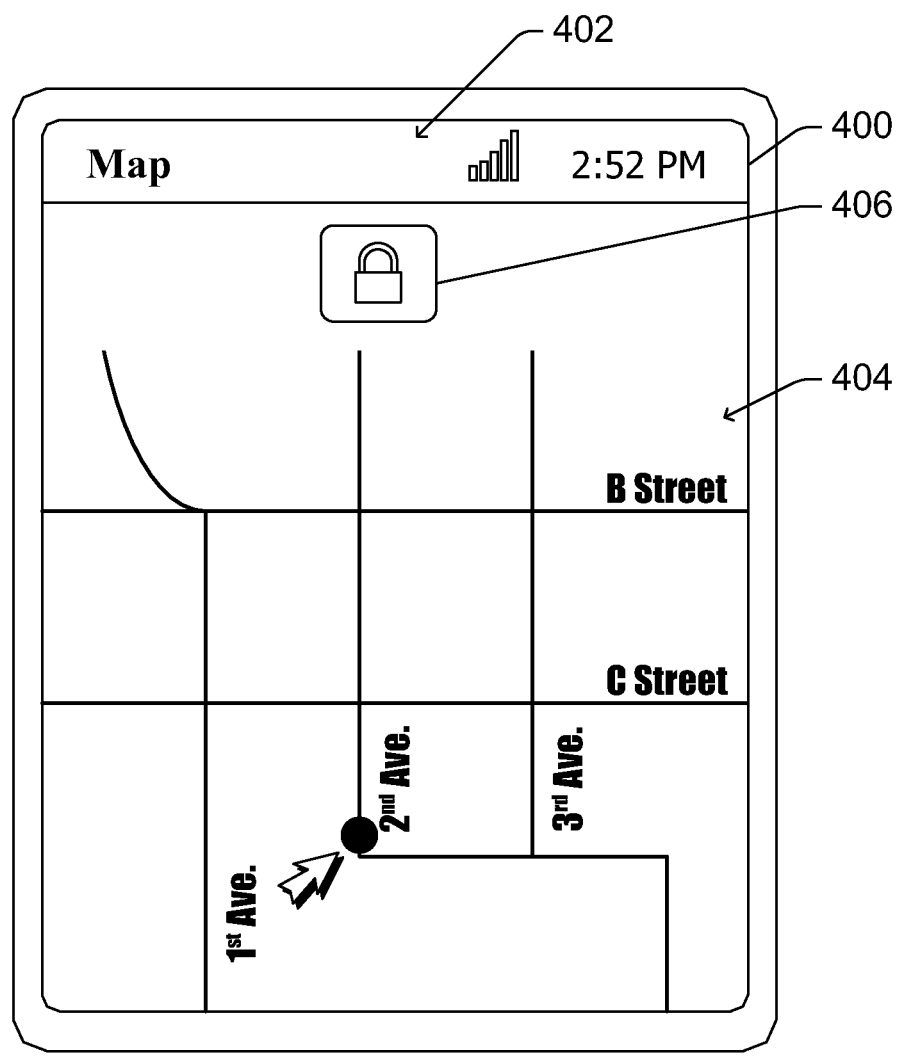
FIG. 4 is a diagram illustrating an example screen display of a locked mobile communications device in accordance with one or more embodiments.

FIG. 4 is a diagram illustrating an example screen display of a locked mobile communications device in accordance with one or more embodiments. In FIG. 4, screen 400 is displayed having a header portion 402 and an application display portion 404, analogous to header portion 202 and application display portion 402 of FIG. 2. As shown in FIG. 4, an image from the map application is displayed in display portion 404 even though the device is locked.

Screen 400 also includes a lock button 406. Lock button 406 can be displayed in application display portion 404 by locked display module 122 or alternatively another module or application. For example, locked display module 122 can generate an overlay that is lock button 406 and provide the overlay along with the image from the map application to the display driver associated with screen 400. Alternatively, lock button 406 can be displayed elsewhere, such as in header portion 402.

Lock button 406 signifies to a user of the mobile communications device that the mobile communications device is currently locked. Lock button 406 can be selected by the user in a variety of different manners to request that the mobile communications device be unlocked, such as by pressing lock button 406, tapping lock button 406 a particular number of times in rapid succession, pressing and sliding lock button 406 to the left or right, and so forth. Such a request to unlock the device is typically followed by user entry of particular character or number sequence, or some other code or pattern, to unlock the device.

Figure 5:
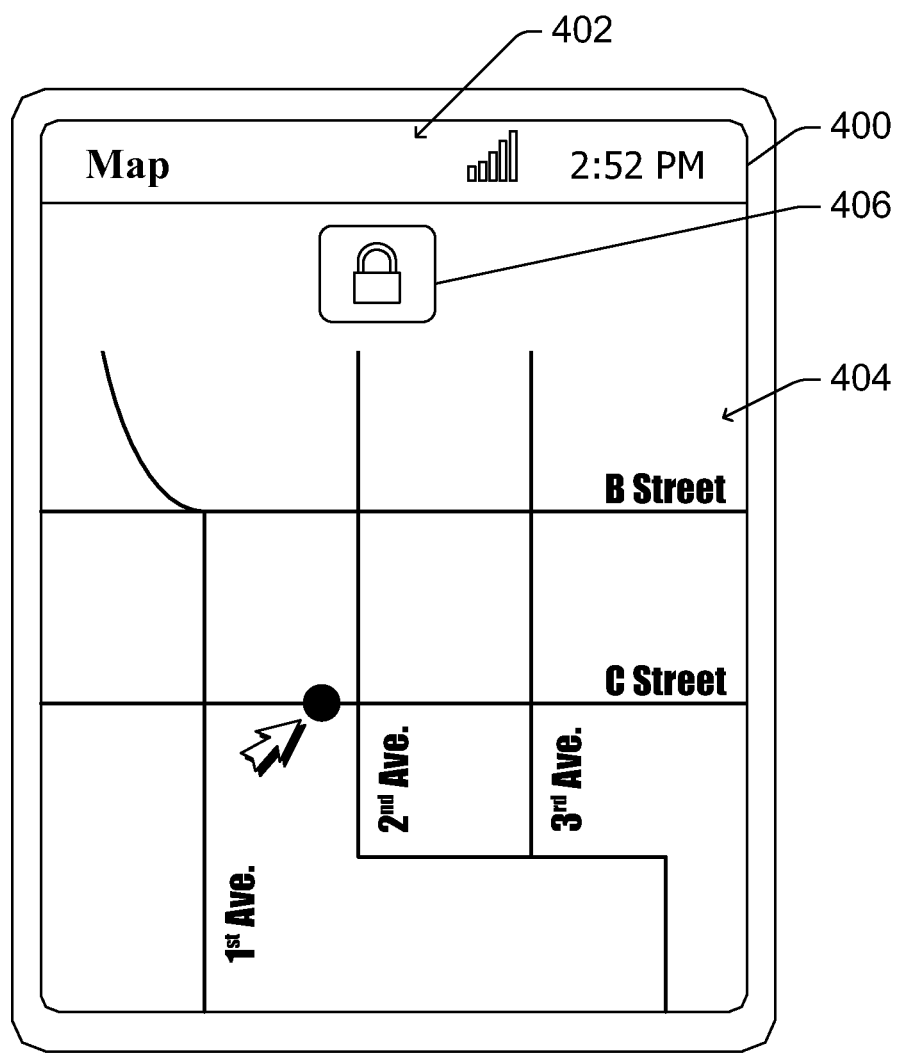
FIG. 5 is a diagram illustrating another example screen display of a locked mobile communications device in accordance with one or more embodiments.

FIG. 5 is a diagram illustrating another example screen display of a locked mobile communications device in accordance with one or more embodiments. In FIG. 5, screen 400 is displayed having a header portion 402, an application display portion 404, and a lock button 406 as discussed above with reference to FIG. 4.

In FIG. 5, however, the image displayed in application display portion 404 is different than the image illustrated in FIG. 4. This change in images displayed in portion 404 is a result of a different image being generated by the map application being displayed in portion 404 while the map application is running.

Thus, as can be seen in the examples of FIGS. 4 and 5, screen 400 displays images generated by the map application in application display portion 404. These images are displayed even though the mobile communications device is locked. These images also change over time as new images are generated by the map application as the map application runs while the mobile communications device is locked.

Additionally, it can be seen from the discussions herein that the application display on a locked device techniques allow a user to quickly and easily identify an application to be displayed while the mobile communications device is locked. For example, the user can simply enter on a touchscreen a particular gesture with his or her figure while the desired application is being displayed, and that desired application becomes the application displayed while the device is locked. Thus, the user can have his or her device locked and at the same time be able to continue to monitor the application and see images generated by the application. The user is able to see these images without needing to repeatedly unlock the device, check the application, and relock the device.

Returning to FIG. 1, locked display module 122 displays images generated by an application 106 while device 100 is locked in response to a user request for a particular application to be displayed while device 100 is locked. It should be noted that device 100 can still be locked in a more traditional manner, such as in response to a user request for a traditional locking of device 100, after a particular amount of time has elapsed with no user input, and so forth. In such situations, a generic image is displayed to the user while screen 104 is turned on and device 100 is locked. This generic image, however, is not based on images generated by application 106 while device 100 is locked.

Additionally, as discussed above situations can arise where power-save module 118 enters a power-saving mode (e.g., turns off screen 104) while mobile communications device 100 is locked. In one or more embodiments, locked display module 122 displays images generated by an application 106 after device 100 resumes operation from the power-saving mode (e.g., after screen 104 is turned back on by power-save module 118). The particular application 106 whose generated images are displayed by locked display module 122 can be determined in different manners. For example, the particular application 106 whose generated images are displayed by locked display module 122 can be the application for which a user request for a particular application to be displayed while device 100 is locked is received. By way of another example, the particular application 106 whose generated images are displayed by locked display module 122 can be the top-level application at the time device 100 is locked (or enters a power-saving mode). By way of yet another example, the particular application 106 whose generated images are displayed by locked display module 122 can be a user-specified application identified in a user configuration or parameter setting. It should be noted that locked display module 122 can display images generated by an application when resuming from a power-saving mode regardless of whether a user request for a particular application to be displayed while device 100 is locked is received.

Locked display module 122 can determine when device 100 has resumed operation from a power-saving mode in a variety of different manners. In one or more embodiments, power-save module 118 notifies locked display module 122 that device 100 has resumed operation from a power-saving mode. Alternatively, locked display module 122 can determine when device 100 has resumed operation from a power-saving mode, such as intercepting commands issued by power-save module 118, identifying settings or state of other components or modules of device 100 (e.g., identifying whether screen 104 is turned on), and so forth.

For example, a user request for a particular application to be displayed while device 100 is locked can be received. Device 100 is subsequently locked, and after a particular amount of time device 100 enters a power-saving mode by power-save module 118 turning off screen 104. Device 100 can subsequently resume operation from the power-saving mode, such as in response to a user input being received via input module 114, by power-save module 118 turning back on screen 104. Device 100 is still locked, but locked display module 122 displays images generated by the particular application 106.

By way of another example, no user request for a particular application to be displayed while device 100 is locked may be received. Device 100 is subsequently locked and a generic image is displayed on screen 104. After a particular amount of time device 100 enters a power-saving mode by power-save module 118 turning off screen 104. Device 100 can subsequently resume operation from the power-saving mode, such as in response to a user input being received via input module 114, by power-save module 118 turning back on screen 104. Device 100 is still locked, but locked display module 122 displays images generated by the particular application 106 rather than the generic image.

Additionally, in one or more embodiments a user of device 100 can elect to opt out of having a particular one or more applications displayed while device 100 is locked. This allows the user to prevent images from being displayed by an application that may display images that include sensitive data (e.g., confidential work emails) or other images that the user desires not to be displayed. The user can select these particular one or more applications in a variety of manners, such as entering a particular gesture while the application is the top-level application, selecting a menu item while the application is the top-level application, accessing a configuration menu or window of the application, and so forth. Alternatively, all applications can default to being opted out of being displayed while device 100 is locked, and the user can elect to opt in to having a particular one or more applications displayed while device 100 is locked. The user can select these particular one or more applications in a variety of manners, such as entering a particular gesture while the application is the top-level application, selecting a menu item while the application is the top-level application, accessing a configuration menu or window of the application, and so forth.

Figure 6:
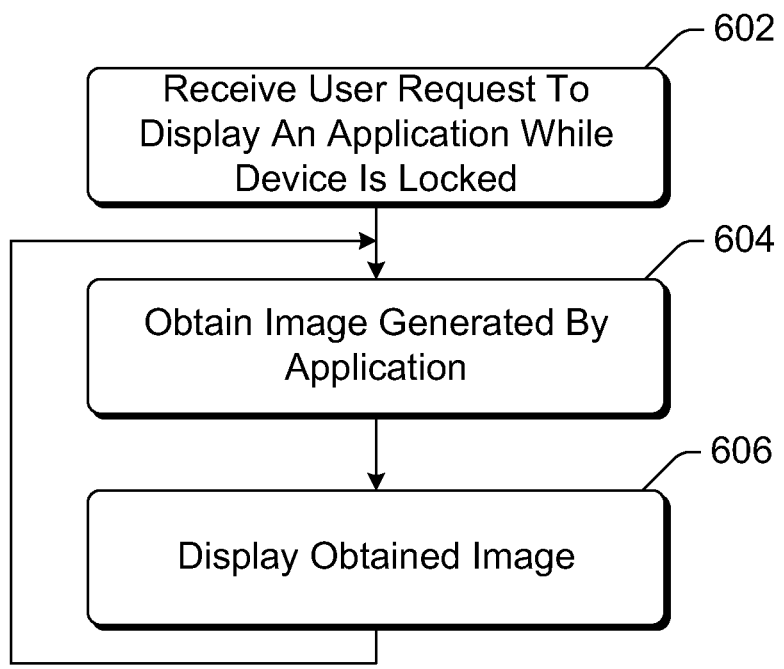
FIG. 6 is a flowchart illustrating an example process for application display on a locked device in accordance with one or more embodiments.

FIG. 6 is a flowchart illustrating an example process 600 for application display on a locked device in accordance with one or more embodiments. Process 600 is carried out by a device, such as mobile communications device 100 of FIG. 1, and can be implemented in software, firmware, hardware, or combinations thereof. Process 600 is an example process for application display on a locked device; additional discussions of application display on a locked device are included herein with reference to different figures.

In process 600, a user request to display an application while the device is locked is received (act 602). This user request can be received in a variety of different manners, such as input of a user gesture, selection of a menu item, and so forth.

In response to the user request received in act 602, an image generated by the application is obtained (act 604) and displayed (act 606). This image is obtained and displayed while the device is locked as discussed above. Acts 604 and 606 can be repeated multiple times, allowing multiple images generated by an application to be displayed while the device is locked as discussed above. Acts 604 and 606 can be repeated until a user request to unlock the device is received, or another module (e.g., power-save module 118) indicates to cease displaying the images.

Figure 7:
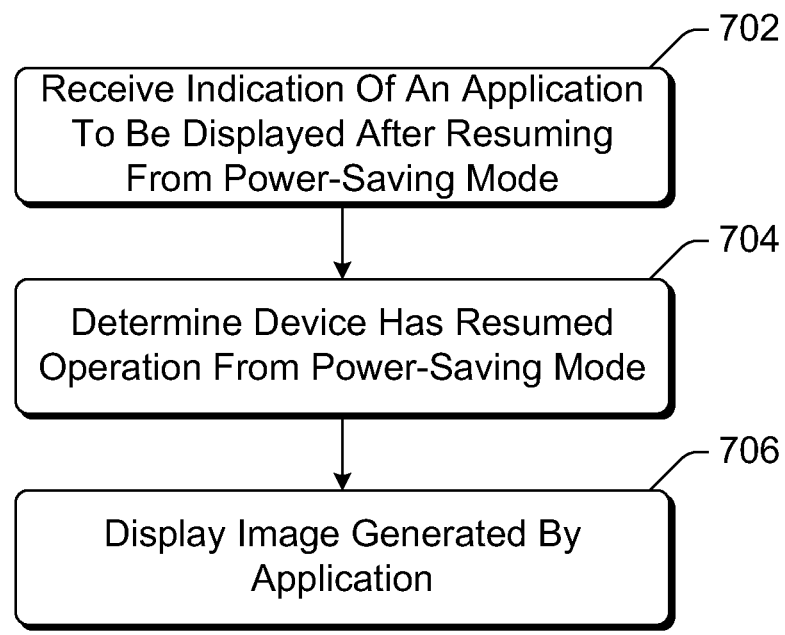
FIG. 7 is a flowchart illustrating another example process for application display on a locked device in accordance with one or more embodiments.

FIG. 7 is a flowchart illustrating another example process 700 for application display on a locked device in accordance with one or more embodiments. Process 700 is carried out by a device, such as mobile communications device 100 of FIG. 1, and can be implemented in software, firmware, hardware, or combinations thereof. Process 700 is an example process for application display on a locked device; additional discussions of application display on a locked device are included herein with reference to different figures.

In process 700, an indication of an application to be displayed after resuming from a power-saving mode is received (act 702). This indication can be received in a variety of different manners as discussed above, such as a configuration setting input by the user.

After the device has entered a power-saving mode, a determination is made that the device has resumed operation from the power-saving mode (act 704). This determination can be made in a variety of manners, such as in response to a notification from a power-save module (e.g., module 118 of FIG. 1) that the device has resumed from the power-saving mode.

In response to the device resuming operation from the power-saving mode, an image generated by the application is displayed (act 706). This application is the application for which the indication was received in act 702, and the image generated by the application is generated after the device resumes operation from the power-saving mode. Accordingly, the image generated is a current output or image of the application when the device resumes operation form the power-saving mode. Additionally, multiple images from this application can be displayed while the device remains locked, as discussed above. The display of such images can continue until a user request to unlock the device is received, or another module (e.g., power-save module 118) indicates to cease displaying the images.

Figure 8:
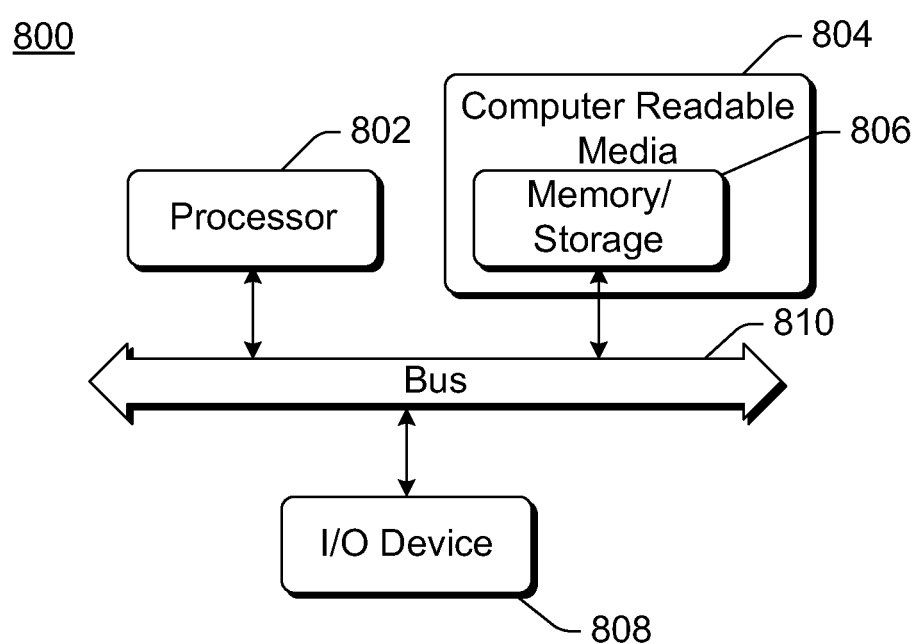
FIG. 8 illustrates an example computing device that can be configured to implement the application display on a locked device in accordance with one or more embodiments.

FIG. 8 illustrates an example computing device 800 that can be configured to implement the application display on a locked device in accordance with one or more embodiments. Computing device 800 can be, for example, mobile communications device 100 of FIG. 1.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or non-volatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. The features of the application display on a locked device techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method in a device, the method comprising:
receiving, when the device is not locked, a user request entered as a gesture to display an application while the device is locked, wherein the application is a top-level application of multiple applications running on the device when the user request is received, wherein the user request entered as the gesture does not appear to manipulate the application when received and is effective to display images generated by another of the multiple applications when received while the other application is a top-level application; and
in response to the user request to display the other application while the device is locked, repeatedly:
obtaining an image generated by the application while the device is locked,
displaying the image generated by the application while the device is locked in lieu of displaying a generic image, and
ignoring inputs received while the device is locked, wherein the received inputs are effective to perform actions with the application relative to the image when the device is not locked.

2. A method as recited in claim 1, further comprising receiving an additional user request as a user selection of a menu item to display the application while the device is locked.

3. A method as recited in claim 1, wherein receiving the user request comprises receiving the gesture entered by a user on a touchscreen of the device.

4. A method as recited in claim 1, wherein repeating the obtaining and displaying comprises obtaining and displaying an initial image as the image for a first iteration and obtaining and displaying multiple additional images as the image for subsequent iterations, wherein the multiple additional images are generated by the application while the device is locked.

5. A method as recited in claim 4, wherein the obtaining and displaying the multiple additional images comprises selecting, at particular intervals, from multiple images generated by the application, and displaying the selected images.

6. A method as recited in claim 4, wherein the obtaining and displaying the multiple additional images comprises displaying multiple images generated by the application in a same manner as when the device is not locked.

7. A method as recited in claim 1, further comprising:
allowing the device to enter a power-saving mode in which a screen of the device is turned off; and
displaying an additional image generated by the application when the device resumes from the power-saving mode.

8. A method as recited in claim 1, further comprising exposing an application programming interface to the application, and wherein obtaining the image comprises obtaining the image provided by the application when the application invokes a method of the application programming interface.

9. A method as recited in claim 1, wherein the device comprises a mobile communications device.

10. A method as recited in claim 1, further comprising locking the device in response to the user request.

11. One or more computer memory devices having stored thereon multiple instructions that, when executed by one or more processors of a device, cause the one or more processors to:
receive an indication entered as a gesture of an application to be displayed upon resuming operation from a power-saving mode, wherein the application is a top-level application of multiple applications, wherein the indication entered as the gesture does not appear to manipulate the application when entered and is receivable relative to at least one other application to indicate the at least one other application for display upon resuming operation from power save mode when received while the at least one other application is the top-level application; and
repeatedly display, in response to resuming operation from the power-saving mode, an image generated by the application after resuming from the power-saving mode, wherein the device is locked to prevent user input relative to the image after resuming operation from the power-saving mode.

12. One or more computer storage media as recited in claim 11, wherein to display the image is to display the image generated by the application while the device is locked.

13. One or more computer storage media as recited in claim 11, wherein the application to be displayed upon resuming operation from the power-saving mode is identifiable in a user configuration setting of the device.

14. One or more computer storage media as recited in claim 11, wherein the instructions further cause the one or more processors to:
receive a user request to display the application while the device is locked; and
in response to the user request to display the application while the device is locked and is not in the power-saving mode,
obtain additional images generated by the application, and
display the additional images generated by the application while the device is locked.

15. One or more computer storage media as recited in claim 14, wherein to obtain the additional images is to select, at particular intervals, images generated by the application while the device is locked, the selected images comprising the additional images.

16. One or more computer storage media as recited in claim 14, wherein to obtain and display the additional images is to obtain and display images generated by the application in a same manner as when the device is not locked.

17. One or more computer storage media as recited in claim 14, wherein the instructions further cause the one or more processors to expose an application programming interface, and wherein to obtain the additional images is to receive the images provided by the application when the application invokes a method of the application programming interface.

18. One or more computer storage media as recited in claim 11, wherein the device comprises a mobile communications device.

19. One or more computer memory devices having stored thereon multiple instructions that, when executed by one or more processors of a mobile communications device, cause the one or more processors to:
receive a user input entered as a gesture on a touchscreen of the mobile communications device, the user input indicating a user request to display images generated by an application while the mobile communications device is locked, wherein the application is a top-level application of multiple applications running on the mobile communications device and is displayed via the touchscreen when the user input is entered, wherein the user input entered as the gesture does not appear to manipulate the application when entered and is effective to display images generated by another of the multiple applications when received while the other application is the top-level application; and
in response to the user input and while the mobile communications device is locked, repeatedly:
obtain an image generated by the application, and
display the image output by the application.

20. A method as recited in claim 1, wherein applications that are displayable while the device is locked include at least a calendar application and another application.

* * * * *